United States Patent
Abe

(10) Patent No.: US 7,046,277 B2
(45) Date of Patent: *May 16, 2006

(54) IMAGE INTERPOLATING DEVICE, INCLUDING INTERPOLATION AND MODIFICATION PROCESSORS

(75) Inventor: Nobuaki Abe, Saitama (JP)

(73) Assignee: PENTAX Corporation, Tokyo (JP)

(*) Notice: Subject to any disclaimer, the term of this patent is extended or adjusted under 35 U.S.C. 154(b) by 872 days.

This patent is subject to a terminal disclaimer.

(21) Appl. No.: 10/050,991

(22) Filed: Jan. 22, 2002

(65) Prior Publication Data

US 2002/0101525 A1    Aug. 1, 2002

(30) Foreign Application Priority Data

Jan. 26, 2001 (JP) ............................ P2001-018044
Feb. 7, 2001 (JP) ............................ P2001-030656

(51) Int. Cl.
    *H04N 5/235* (2006.01)

(52) U.S. Cl. ............... 348/222.1; 348/272; 348/223.1; 345/589

(58) Field of Classification Search ............. 348/222.1, 348/223.1, 266, 267, 272–277, 280; 345/589
See application file for complete search history.

(56) References Cited

U.S. PATENT DOCUMENTS 6,611,287 B1* 8/2003 Yamamoto et al. ...... 348/222.1
6,836,289 B1* 12/2004 Koshiba et al. ............. 348/273
2002/0093510 A1* 7/2002 Abe ............................ 345/589

OTHER PUBLICATIONS

U.S. Appl. No. 10/043,127 to Abe, entitled "Image Interpolating Device", which was filed on Jan. 14, 2002.
U.S. Appl. No. 10/043,318 to Abe, entitled "Image Interpolating Device", which was filed on Jan. 14, 2002.
U.S. Appl. No. 10/050,990 to Abe, entitled "Image Interpolating Device", which was filed on Jan. 22, 2002.

* cited by examiner

Primary Examiner—David Ometz
Assistant Examiner—Gevell Selby
(74) Attorney, Agent, or Firm—Greenblum& Bernstein, P.L.C.

(57) ABSTRACT

An image interpolating device comprises a color filter, in which R, G, and B color filter elements are disposed in a checkerboard arrangement, and an imaging device which generates R, G, and B-signals corresponding to the color filter elements. In an interpolation process, the differences between a G-signal of an objective pixel and G-signals of pixels adjacent to the right, left, upper, and lower sides of the objective pixel are checked. For example, if the G-signal of the left side pixel is the closest to that of the objective pixel, a luminance value Y, color difference signals Cb and Cr, and a modified luminance signal YG of the objective pixel are obtained using the R, G, and B-signals of the left side pixel. Regarding the objective pixel, a B-signal is obtained and the G-signal is modified, using the modified luminance value YG, and the color difference signals Cb and Cr.

23 Claims, 12 Drawing Sheets

Fig. 2

| R(0,0) | G(1,0) | R(2,0) | G(3,0) | R(4,0) | |
|--------|--------|--------|--------|--------|---|
| G(0,1) | B(1,1) | G(2,1) | B(3,1) | G(4,1) | |
| R(0,2) | G(1,2) | R(2,2) | G(3,2) | R(4,2) | |
| G(0,3) | B(1,3) | G(2,3) | B(3,3) | G(4,3) | |
| R(0,4) | G(1,4) | R(2,4) | G(3,4) | R(4,4) | |
|        |        |        |        |        | |

Fig. 6

| R(0, 0) g | G(1, 0) r, b | R(2, 0) g | G(3, 0) r, b | R(4, 0) g | |
| --- | --- | --- | --- | --- | --- |
| G(0, 1) r, b | B(1, 1) g | G(2, 1) r, b | B(3, 1) g | G(4, 1) r, b | |
| R(0, 2) g | G(1, 2) r, b | R(2, 2) g | G(3, 2) r, b | R(4, 2) g | |
| G(0, 3) r, b | B(1, 3) g | G(2, 3) r, b | B(3, 3) g | G(4, 3) r, b | |
| R(0, 4) g | G(1, 4) r, b | R(2, 4) g | G(3, 4) r, b | R(4, 4) g | |
| | | | | | |

IMAGE INTERPOLATING DEVICE, INCLUDING INTERPOLATION AND MODIFICATION PROCESSORS

BACKGROUND OF THE INVENTION

1. Field of the Invention

The present invention relates to an image interpolating device provided in a digital camera, for example, to improve color image quality.

2. Description of the Related Art

Conventionally, there is known a digital camera in which a color filter of the Bayer arrangement is provided on a light receiving surface of an imaging device such as a CCD so as to sense a color image. The color filter is formed by arranging red(R), green(G), and blue(B) color filter elements in a checkerboard arrangement, and the color filter elements correspond to photodiodes of the imaging device. Therefore, a pixel signal of a color, which corresponds to each of the color filter elements, is generated by each of the photodiodes. For example, an R pixel signal is generated by a photodiode corresponding to an R color filter element.

A pixel signal may be subjected to an interpolating process so that a color image having a higher quality is obtained, in comparison with the case in which a pixel signal output from the imaging device is used just as it is. In a usual interpolating process, regarding an objective pixel from which an R-signal is obtained by a photodiode, a G-signal is generated by taking an average of the G-signals of pixels positioned around the objective pixel, and a B-signal is generated by taking an average of the B-signals of pixels positioned around the objective pixel. However, for example, in an image in which spatial frequency is high, the actual color of the objective pixel, for which a color is to be obtained by interpolation, may be largely different from the actual colors of the pixels around the objective pixel. In such a case, chromatic blur occurs because of the color signal of the pixel obtained by interpolation.

SUMMARY OF THE INVENTION

Therefore, an object of the present invention is to reduce the chromatic blur which occurs in a reproduced image because of the interpolating process.

According to the present invention, there is provided an image interpolating device comprising a color filter, an imaging device, a pattern-setting processor, a G-interpolation processor, an R/B-interpolation processor, a first interpolation/modification processor, and a second interpolation/modification processor.

The color filter has a first row, in which red(R) and green(G) color filter elements are alternately aligned in the horizontal direction, and a second row, in which G and blue(B) color filter elements are alternately aligned in the horizontal direction. The second row is adjacent to the upper or lower side of the first row. The imaging device generates first R, G, and B-signals which are pixel signals corresponding to the color filter elements. The pattern-setting processor extracts images belonging to a first pattern, in which a pixel having the first R-signal is positioned at the upper-left corner of a 2×2 pixel matrix, a second pattern, in which a pixel having the first G-signal is positioned at the upper-right corner of the 2×2 pixel matrix, a third pattern, in which a pixel having the first G-signal is positioned at the lower-left corner of the 2×2 pixel matrix, and a fourth pattern, in which a pixel having the first B-signal is positioned at the lower-right corner of the 2×2 pixel matrix, from the first R, G, and B-signals generated by the imaging device. The G-interpolation processor, regarding first and fourth objective pixels contained in the images belonging to the first and fourth patterns, obtains a second G-signal by utilizing the first G-signals of pixels adjacent to the first or fourth objective pixel. The R/B-interpolation processor, regarding second and third objective pixels contained in the images belonging to the second and third patterns, obtains second R and B-signals by utilizing the first R and B-signals of pixels adjacent to the second and third objective pixels. The first interpolation/modification processor extracts a first similar pixel which has the closest luminance value to that of the first objective pixel, from pixels adjacent to the first objective pixel, obtains a third B-signal of the first objective pixel by a first interpolation process, and modifies the second G-signal of the first objective pixel, based on first information of the first similar pixel. The second interpolation/modification processor extracts a second similar pixel which has the closest luminance value to that of the fourth objective pixel, from pixels adjacent to the fourth objective pixel, obtains a third R-signal of the fourth objective pixel by a second interpolation process, and modifies the second G-signal of the fourth objective pixel, based on second information of the second similar pixel.

Further, according to the present invention, there is provided an image interpolating device comprising an imaging device, an interpolation processor, and a modification processor.

The imaging device has a light receiving surface on which pixels are disposed in a matrix arrangement. A subject image is formed on the light receiving surface to generate first color signals corresponding to the subject image in the pixels. The interpolation processor performs an interpolation process, using the first color signals generated in a plurality of adjacent pixels positioned adjacent to an objective pixel, to obtain a second color signal of the objective pixel. The modification processor extracts a similar pixel which has the closest luminance value to that of the objective pixel, from pixels adjacent to the objective pixel, and modifies the second color signal of the objective pixel, based on a luminance value and color difference signals Cb and Cr of the similar pixel, or based on a color signal of the objective pixel and color difference signals Cb and Cr of the similar pixel.

BRIEF DESCRIPTION OF THE DRAWINGS

The objects and advantages of the present invention will be better understood from the following description, with reference to the accompanying drawings in which:

FIG. 2 is a view showing an arrangement of color filter elements of a color filter, and pixel signals of an image belonging to a pattern extracted in a pattern-setting unit;

FIG. 6 is a view showing pixel signals obtained by executing the G-interpolation process routine and the R/B-interpolation process routine;

DESCRIPTION OF THE PREFERRED EMBODIMENTS

Figure 1:
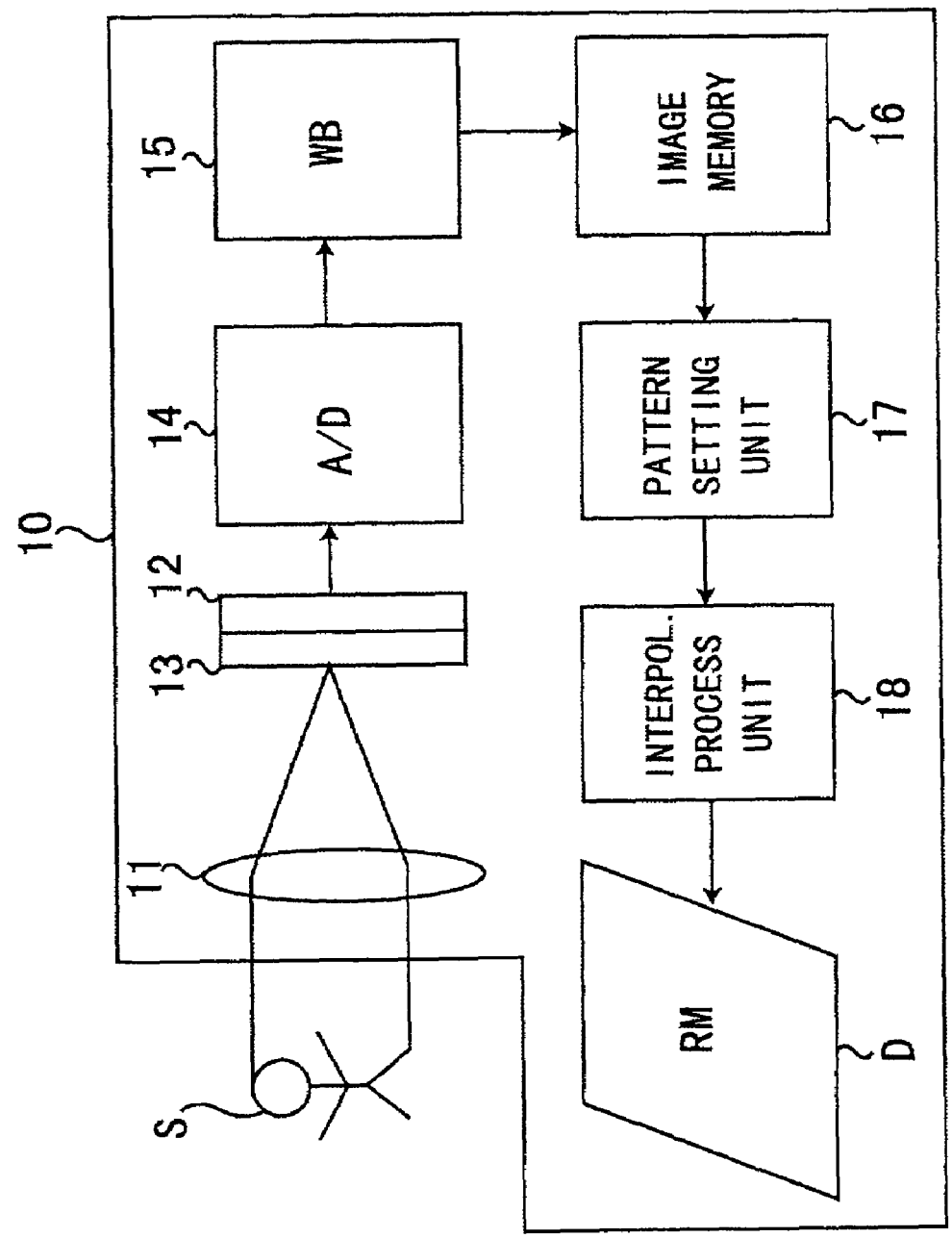
FIG. 1 is a block diagram showing a general structure of a digital camera provided with an image interpolating device to which a first embodiment of the present invention is applied.

The present invention will be described below with reference to embodiments shown in the drawings.

FIG. 1 is a block diagram showing a general structure of a digital camera 10 provided with an image interpolating device to which a first embodiment of the present invention is applied.

A CCD 12, which is an imaging device, is disposed behind a photographing lens 11, and a color filter 13 is provided on a light receiving surface of the CCD 12. Namely, an optical image of a subject S, which is obtained by the photographing lens 11, is formed on the light receiving surface of the CCD 12, so that color pixel signals forming the subject image are generated on photodiodes of the CCD 12. The pixel signals are read from the CCD 12, and are converted to digital signals by an A/D converter 14. The digital pixel signals are subjected to a white balance adjustment in a white balance adjusting circuit 15, and are then stored in an image memory 16.

The pixel signals are read from the image memory 16, and input to a pattern-setting unit 17. As will be described in detail later, in the pattern-setting unit 17, pixel signals forming a predetermined arrangement pattern are extracted from all the pixel signals, and are classified into first, second, third, and fourth patterns. In an interpolation process unit 18, the pixel signals extracted in the pattern-setting unit 17 are subjected to an interpolating process corresponding to the pattern. The pixel signals, which have been subjected to the interpolating process and output from the interpolation process unit 18, are recorded in a recording medium D, such as a memory card. Note that the white balance adjusting circuit 15 does not have to be provided behind the A/D converter 14, and it can be behind the interpolation process unit 18.

Figure 2:
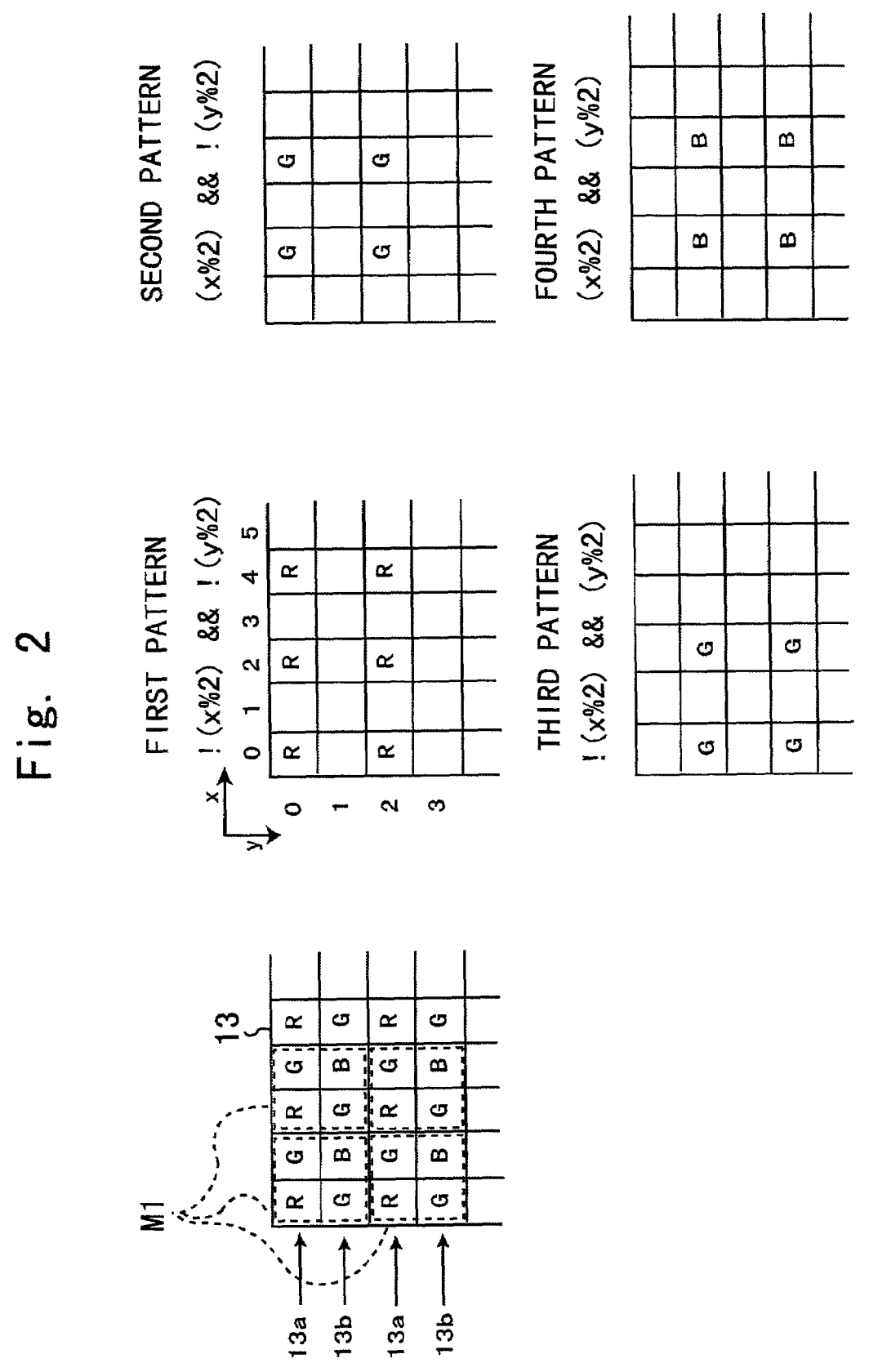

FIG. 2 is a view showing an arrangement of color filter elements of the color filter 13, and pixel signals of an image belonging to a pattern extracted in the pattern-setting unit 17. The color filter 13 is composed of red(R), green(G), and blue(B) color filter elements, which are disposed in accordance with the Bayer arrangement. Namely, the color filter 13 is composed of a first row 13a, in which R and G color filter elements are alternately aligned in the horizontal direction, and a second row, which is adjacent to the upper or lower side of the first row 13a, and in which G and B color filter elements are alternately aligned in the horizontal direction. In the CCD 12, first R, G, and B-signals, which are pixel signals corresponding to the color filter elements, are generated.

The color filter 13 is divided into a 2×2 pixel matrix M1 in which an R color filter element is positioned at the upper-left corner, a G color filter element is positioned at both the upper-right corner and the lower-left corner, and a B color filter element is positioned at the lower-right corner. The pattern-setting unit 17 extracts images belonging to a first pattern, in which a pixel having the first R-signal is positioned at the upper-left corner of the 2×2 pixel matrix, a second pattern, in which a pixel having the first G-signal is positioned at the upper-right corner of the 2×2 pixel matrix, a third pattern, in which a pixel having the first G-signal is positioned at the lower-left corner of the 2×2 pixel matrix, and a fourth pattern, in which a pixel having the first B-signal is positioned at the lower-right corner of the 2×2 pixel matrix, from the first R, G, and B-signals generated by the CCD 12.

In the pattern-setting unit 17, the first pattern is extracted from all of the pixel signals forming the whole image, according to the logical operation (1) described in C language.

$$!(x\%2)\&\&!(y\%2) \tag{1}$$

Note that, in the logical operation (1), "x" and "y" respectively indicate an abscissa and an ordinate in which the upper-left corner of the image is the origin (0,0). Namely, the coordinate of the R-signal of the left corner is (0,0), and the coordinate of the G-signal of the next pixel on the right side is (1,0). Further, in the logical operation (1), "!" indicates the logical negation, and "%" indicates the residue, and "&&" indicates the logical product. Therefore, according to the logical operation (1), an image composed of a pixel, in which both the x-ordinate and the y-ordinate are even numbers, is extracted (R-signal in FIG. 2).

Similarly, the second pattern, the third pattern, and the fourth pattern are respectively extracted according to the logical operations (2), (3), and (4).

$$(x\%2)\&\&!(y\%2) \tag{2}$$

$$!(x\%2)\&\&(y\%2) \tag{3}$$

$$(x\%2)\&\&(y\%2) \tag{4}$$

Figures 3, 4:
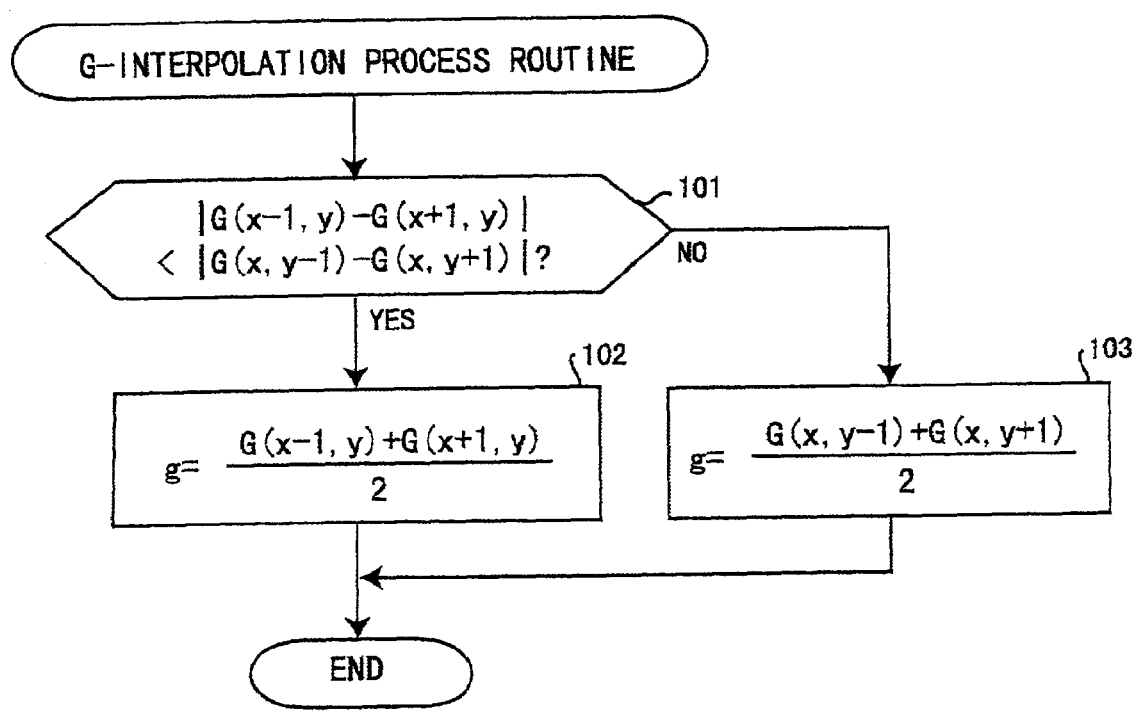
FIG. 3 is a view showing coordinates and colors of pixels forming an image.
FIG. 4 is a flowchart of a G-interpolation process routine.

With reference to FIGS. 3 through 8, an operation in the interpolation process unit 18 will be described below. FIG. 3 shows coordinates and colors of pixels forming an image, which are stored in the image memory 16. In the interpolation process unit 18, as will be described later, the G-interpolation process routine (FIG. 4), the R/B-interpolation process routine (FIG. 5), the first interpolation/modification process routine (FIGS. 7A, 7B), and the second interpolation/modification process routine (FIG. 8) are executed. In these interpolation process routines, the coordinates of the objective pixel, obtained by the interpolation process, are (x,y).

FIG. 4 is a flowchart of the G-interpolation process routine. In the G-interpolation process routine, an interpolation process for images belonging to the first and fourth patterns is performed.

In Step 101, it is determined whether the absolute value of the difference between G(x−1,y) and G(x+1,y) is less than the absolute value of the difference between G(x,y−1) and G(x,y+1). G(x−1,y) is a first G-signal of a pixel adjacent to the left side of the objective pixel. G(x+1,y) is a first G-signal of a pixel adjacent to the right side of the objective pixel. G(x,y−1) is a first G-signal of a pixel adjacent to the upper side of the objective pixel. G(x,y+1) is a first G-signal of a pixel adjacent to the lower side of the objective pixel. When the coordinates of the objective pixel are (2,2), for example, i.e., in the case of an image of the first pattern, the objective pixel is R(2,2), and in Step 101, it is determined whether |(G1,2)−G(3,2)| is less than |(G2,1)−G(2,3)|.

Note that, when the objective pixel is contained in an image belonging to the first pattern, i.e., in the case of an R-signal, the pixels adjacent to the right and left sides are contained in an image belonging to the second pattern, and the pixels adjacent to the upper and lower sides are contained in an image belonging to the third pattern. On the other hand, when the objective pixel is contained in an image belonging to the fourth pattern, i.e., in the case of a B-signal, the pixels adjacent to the right and left sides are contained in an image belonging to the third pattern, and the pixels adjacent to the upper and lower sides are contained in an image belonging to the second pattern.

When it is determined in Step 101 that the absolute value of the difference between the pixel signals adjacent to the right and left sides of the objective pixel is less than the absolute value of the difference between the pixel signals adjacent to the upper and lower sides of the objective pixel, Step 102 is executed in which an arithmetic mean of G(x−1,y) and G(x+1,y), which are pixel signals adjacent to the right and left sides, is obtained as a second G-signal g of the objective pixel. Conversely, when it is determined that the absolute value of the difference between the pixel signals adjacent to the right and left sides of the objective pixel is not less than the absolute value of the difference between the pixel signals adjacent to the upper and lower sides of the objective pixel, Step 103 is executed in which an arithmetic mean of G(x,y−1) and G(x,y+1), which are pixel signals adjacent to the upper and lower sides, is obtained as a second G-signal g of the objective pixel. After the execution of Step 102 or 103, the G-interpolation process ends.

Thus, in the G-interpolation process routine, regarding each of the pixels in the images belonging to the first and fourth patterns, an arithmetic mean of the two first G-signals of a pair, in which the difference is less than that of another pair, is obtained as the second G-signal. When the G-interpolation process routine has been executed for all of the pixels of the images belonging to the first and fourth patterns, the G-signals of all of the pixels forming the whole image have been obtained.

Figure 5:
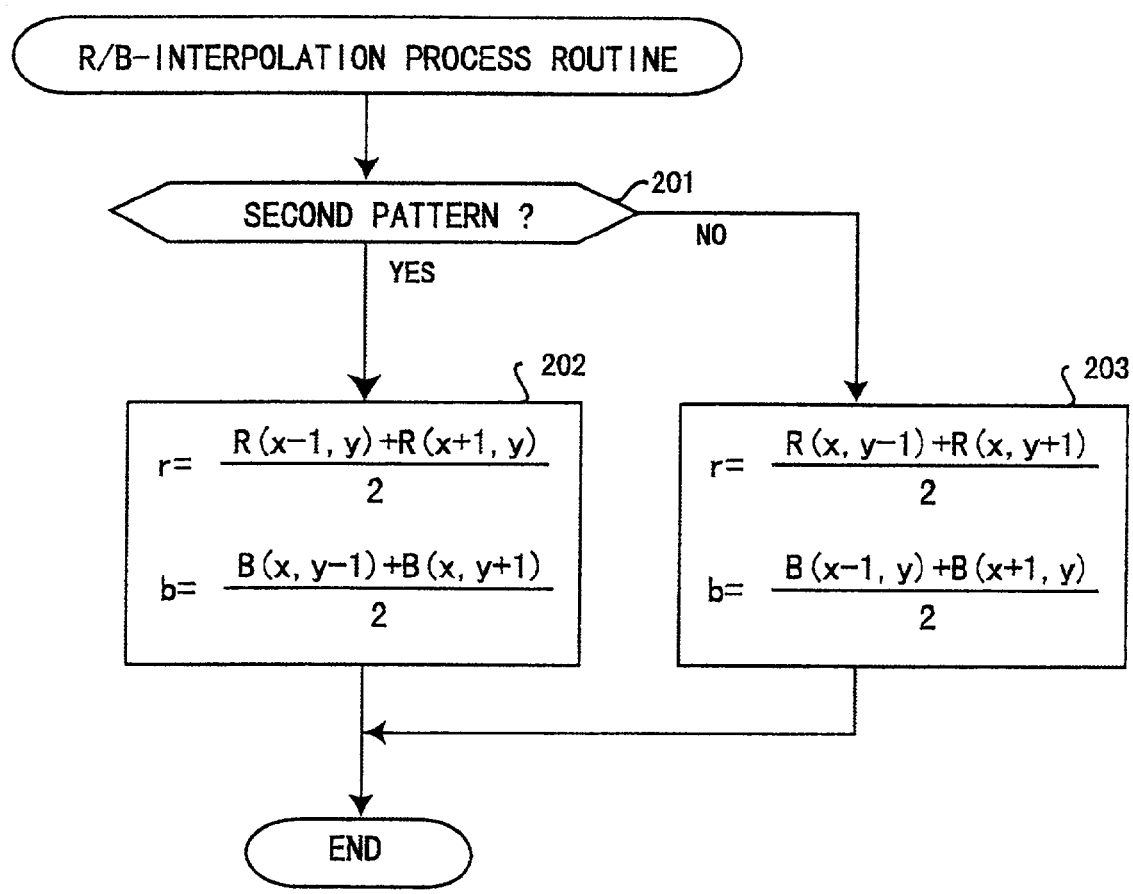
FIG. 5 is a flowchart of an R/B-interpolation process routine.

FIG. 5 is a flowchart of the R/B-interpolation process routine. In the R/B-interpolation process routine, an interpolation process for images belonging to the second and third patterns is performed. Pixels utilized in the R/B-interpolation process routine are contained in the images belonging to the first and fourth patterns.

In Step 201, it is determined whether the objective pixel is contained in an image belonging to the second pattern. When the objective pixel is contained in the second pattern, i.e., when the objective pixel is a first G-signal, which is positioned at the upper-right corner of the pixel matrix M1 (FIG. 2), Step 202 is executed. Conversely, when the objective pixel is not contained in the second pattern, i.e., when the objective pixel is contained in the third pattern, and is a first G-signal which is positioned at the lower-left corner of the pixel matrix M1 (FIG. 2), Step 203 is executed.

In Step 202, an arithmetic mean of R(x−1,y) and R(x+1,y), which are pixel signals adjacent to the right and left sides of the objective pixel (i.e., an image of the first pattern), is obtained as a second R-signal r of the objective pixel. Further, an arithmetic mean of B(x,y−1) and B(x,y+1), which are pixel signals adjacent to the upper and lower sides of the objective pixel (i.e., an image of the fourth pattern), is obtained as a second B-signal b of the objective pixel.

In Step 203, an arithmetic mean of R(x,y−1) and R(x,y+1), which are pixel signals adjacent to the upper and lower sides of the objective pixel (i.e., an image of the first pattern), is obtained as a second R-signal r of the objective pixel. Further, an arithmetic mean of B(x−1,y) and B(x+1,y), which are pixel signals adjacent to the right and left sides of the objective pixel (i.e., an image of the fourth pattern), is obtained as a second B-signal b of the objective pixel.

After the execution of Step 202 or 203, the R/B-interpolation process ends. Thus, in the R/B-interpolation process routine, regarding each of the pixels in the images belonging to the second and third patterns, the pixel signals adjacent to the right, left, upper, and lower sides are interpolated, so that the second R, and B-signals are obtained. When the G-interpolation process routine (FIG. 4) has been executed and the R/B-interpolation process routine has been executed for all of the pixels of the images belonging to the second and third patterns, the G-signals are obtained for all of the pixels forming the whole image, and the second R-signals r and the second B-signals b are obtained for each of the pixels of the images belonging to the second and third patterns, as understood from FIG. 6. Namely, regarding the image belonging to the first pattern, B-signals have not been obtained yet, and regarding the image belonging to the fourth pattern, R-signals have not been obtained yet.

Figure 7A:
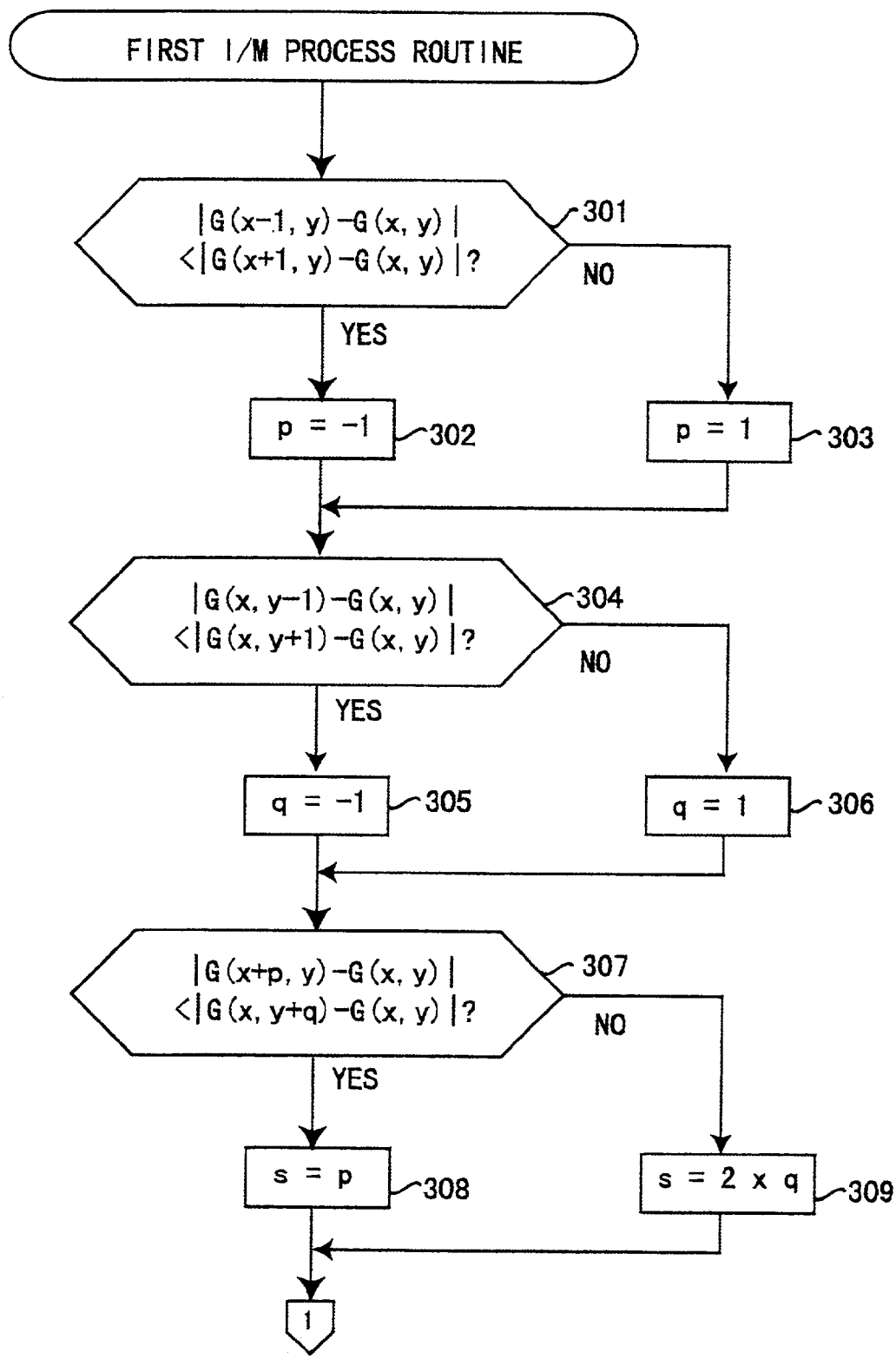
FIGS. 7A and 7B show a flowchart of a first interpolation/modification process routine.
Figure 7B:
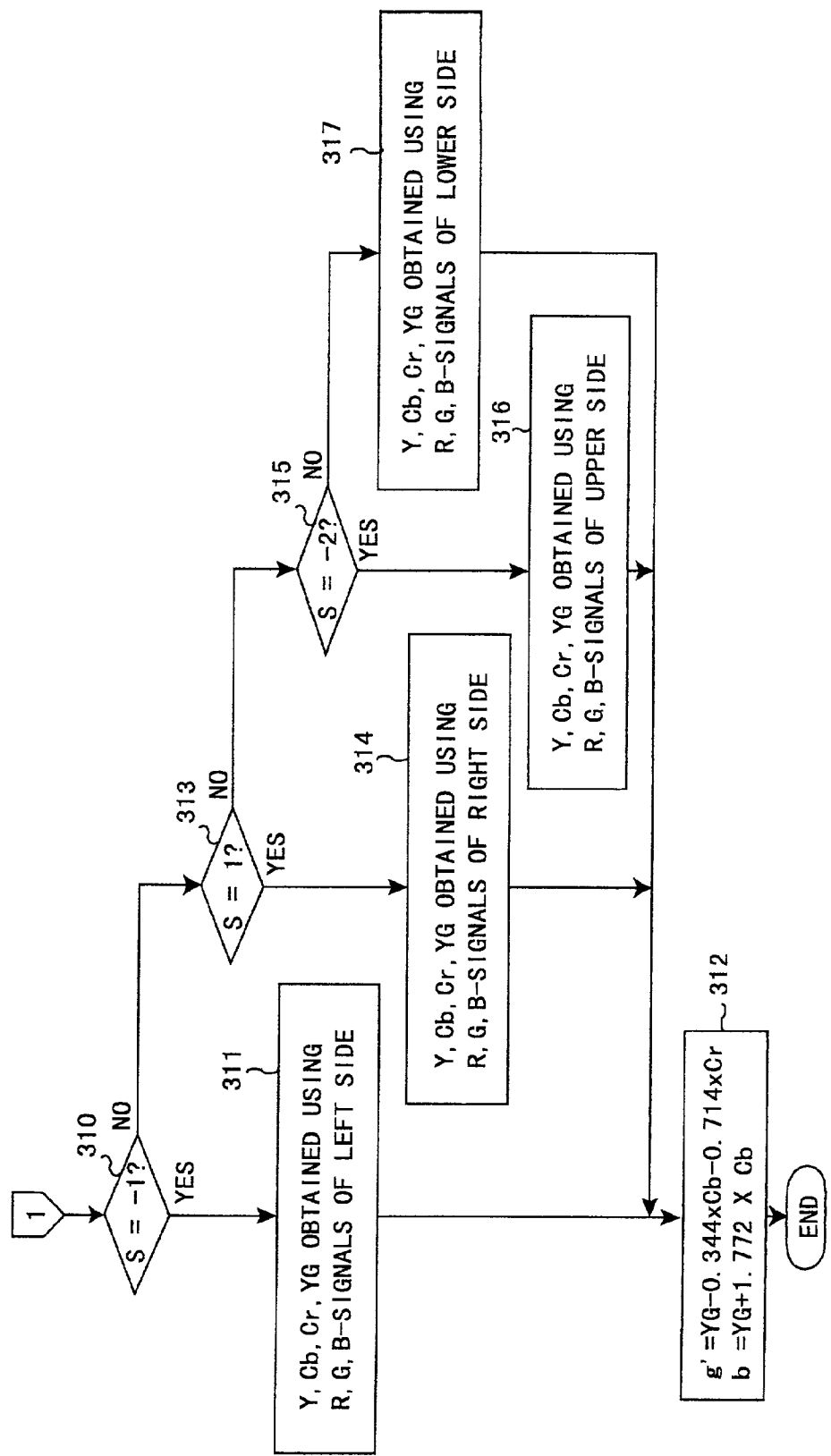

FIGS. 7A and 7B show a flowchart of the first interpolation/modification process routine, by which third B-signals are obtained for the pixels of the image belonging to the first pattern, and the second G-signal obtained by the G-interpolation process routine (FIG. 4) is modified. Pixels utilized in the first interpolation/modification process routine are contained in the images belonging to the second and third patterns, respectively.

In Step 301, it is determined whether the absolute value of the difference between G(x−1,y) and G(x,y) is less than the absolute value of the difference between G(x+1,y) and G(x,y). G(x−1,y) is a first G-signal of a pixel adjacent to the left side of the objective pixel. G(x+1,y) is a first G-signal of a pixel adjacent to the right side of the objective pixel. G(x,y) is a second G-signal of the objective pixel. Thus, it is determined which first G-signal of a pixel, adjacent to the right or left side of the objective pixel, has the closer value to that of the second G-signal of the objective pixel. When the first G-signal of a pixel adjacent to the left side is closer to the second G-signal of the objective pixel, Step 302 is executed in which a parameter p is set to −1. Conversely, when the first G-signal of a pixel adjacent to the right side is closer to the second G-signal of the objective pixel, or when the absolute value of the difference between the first G-signal of a pixel adjacent to the left side and the second G-signal of the objective pixel is equal to the absolute value of the difference between the first G-signal of a pixel adjacent to the right side and the second G-signal of the objective pixel, Step 303 is executed in which the parameter p is set to 1.

In Step 304, it is determined whether the absolute value of the difference between G(x,y−1) and G(x,y) is less than the absolute value of the difference between G(x,y+1) and G(x,y). G(x,y−1) is a first G-signal of a pixel adjacent to the upper side of the objective pixel. G(x,y+1) is a first G-signal of a pixel adjacent to the lower side of the objective pixel. Thus, it is determined which first G-signal of a pixel, adjacent to the upper or lower side of the objective pixel, has the closer value to that of the second G-signal of the objective pixel. When the first G-signal of a pixel adjacent to the upper side is closer to the second G-signal of the objective pixel, Step 305 is executed in which a parameter q is set to −1. Conversely, when the first G-signal of a pixel adjacent to the lower side is closer to the second G-signal of the objective pixel, or when the absolute value of the difference between the first G-signal of a pixel adjacent to the upper side and the second G-signal of the objective pixel is equal to the absolute value of the difference between the first G-signal of a pixel adjacent to the lower side and the second G-signal of the objective pixel, Step 306 is executed in which the parameter q is set to 1.

In Step 307, the values of the G-signals are compared regarding a pixel adjacent to the right or left side of the objective pixel, a pixel adjacent to the upper or lower side of the objective pixel, and the objective pixel. When the first G-signal of the pixel on the left side is closer to the second G-signal of the objective pixel in comparison with the first G-signal on the right side, and the first G-signal of the pixel on the upper side is closer to the second G-signal of the objective pixel in comparison with the first G-signal of the pixel on the lower side, the parameters p and q are −1, and it is determined whether an absolute value of the difference between $G(x-1,y)$ and $G(x,y)$ is less than an absolute value of the difference between $G(x,y-1)$ and $G(x,y)$. When the first G-signal of the left side is closer to the second G-signal of the objective signal, Step 308 is executed in which a parameter s is set to p, i.e., −1. Conversely, when the first G-signal of the upper side is closer or equal to the second G-signal of the objective signal, or when the absolute value of the difference between the first G-signal of a pixel adjacent to the left side and the second G-signal of the objective pixel is equal to the absolute value of the difference between the first G-signal of a pixel adjacent to the upper side and the second G-signal of the objective pixel, Step 309 is executed in which the parameter s is set to 2×q, i.e., −2.

When both of the parameters p and q are 1, when the parameters p and q are −1 and 1, or when the parameters p and q are 1 and −1, Step 307 and Step 308 or 309 are executed in a similar way as the above. Thus, in the first interpolation/modification process routine, regarding the second G-signal of the objective pixel, the values of the first G-signals of the pixels, which are contained in the second and third patterns and positioned adjacent to the objective pixel, are checked. As a result, if the first G-signal of the pixel adjacent to the left side is the closest to the second G-signal of the objective pixel, the parameter s is set to −1. If the first G-signal of the pixel adjacent to the right side is the closest, the parameter s is set to 1, if the first G-signal of the pixel adjacent to the upper side is the closest, the parameter s is set to −2, and if the first G-signal of the pixel adjacent to the lower side is the closest, the parameter s is set to 2.

In this specification, among the adjacent four pixels, the pixel having the first G-signal, which is determined in the first interpolation/modification process routine to have the closest value to the second G-signal of the objective pixel, is referred to as a first similar pixel. Preferably, the pixel having the closest luminance value to that of the objective pixel is selected as the first similar pixel. However, the luminance value of the objective pixel is unknown. Therefore, the luminance value is presumed using the G-signal, so that the first similar pixel is extracted, as described above.

In Step 310, it is determined whether the parameter s is −1, i.e., whether the first similar pixel is adjacent to the left side of the objective pixel. When the parameter s is −1, Step 311 is executed in which a luminance value Y, color difference signals Cb and Cr, and a modified luminance value YG are obtained using $R(x-1,y)$, $G(x-1,y)$, and $B(x-1,y)$ which are the second R, first G, and second B-signals of the first similar pixel.

The luminance value Y, the color difference signals Cb and Cr, and the modified luminance value YG are calculated according to the following formulas (5), (6), (7), and (8).

$$Y=0.299 \times R(x-1,y)+0.587 \times G(x-1,y)+0.114 \times B(x-1,y) \tag{5}$$

$$Cb=-0.169 \times R(x-1,y)-0.331 \times G(x-1,y)+0.5 \times B(x-1,y) \tag{6}$$

$$Cr=0.5 \times R(x-1,y)-0.419 \times G(x-1,y)-0.081 \times B(x-1,y) \tag{7}$$

$$YG=Y \times G(x,y)/G(x-1,y) \tag{8}$$

The formulas (5), (6), and (7) are known. The modified luminance value YG is obtained by multiplying the luminance value Y by a ratio of the second G-signal of the objective pixel and the first G-signal of the first similar pixel, as understood from the formula (8).

In Step 312, the second G-signal of the objective pixel is calculated or modified according to the formula (9), so that a modified G-signal g' is obtained. Further, a third B-signal of the objective signal is calculated according to the formula (10), which is equivalent to an interpolation process. Thus, the first interpolation/modification process routine ends.

$$g'=YG-0.344 \times Cb-0.714 \times Cr \tag{9}$$

$$b=YG+1.772 \times Cb \tag{10}$$

Note that the formula (10) is obtained by defining the color difference signals Cb and Cr as $Cb=(B-Y) \times 0.5/(1-0.114)$ and $Cr=(R-Y) \times 0.5/(1-0.299)$, and by transforming these definition formulas while substituting the modified luminance value YG for the luminance value Y. The formula (9) is obtained by defining the luminance value Y as $Y=0.299 \times R+0.587 \times G+0.114 \times B$, and by transforming this definition formula and the definition formulas of the color difference signals Cb and Cr while substituting the modified luminance value YG for the luminance value Y.

Thus, in the first embodiment, the third B-signal of the objective pixel is obtained by interpolation, and the second G-signal is modified, supposing that the color difference signals Cb and Cr of the objective pixel are equal to the color difference signals Cb and Cr of the first similar pixel, and deeming the modified luminance value YG to be the luminance value of the objective pixel.

When it is determined in Step 310 that the parameter s is not −1, the process goes to Step 313 in which it is determined whether the parameter s is 1, i.e., whether the first similar pixel is adjacent to the right side of the objective pixel. When the parameter s is 1, Step 314 is executed in which a luminance value Y, color difference signals Cb and Cr, and a modified luminance value YG are obtained using the second R, first G, and second B-signals of the first similar pixel.

The luminance value Y, the color difference signals Cb and Cr, and the modified luminance value YG are calculated according to the following formulas (5a), (6a), (7a), and (8a).

$$Y=0.299 \times R(x+1, y)+0.587 \times G(x+1, y)+0.114 \times B(x+1,y) \tag{5a}$$

$$Cb=-0.169 \times R(x+1,y)-0.331 \times G(x+1,y)+0.5 \times B(x+1,y) \tag{6a}$$

$$Cr=0.5 \times R(x+1,y)-0.419 \times G(x+1,y)-0.081 \times B(x+1,y) \tag{7a}$$

$$YG=Y \times G(x,y)/G(x+1,y) \tag{8a}$$

Step 312 is then executed. Namely, the second G-signal of the objective pixel is modified according to the formula (9), so that a modified G-signal g' is obtained. Further, a third B-signal of the objective signal is calculated according to the formula (10). Thus, the first interpolation/modification process routine ends.

When it is determined in Step 313 that the parameter s is not 1, the process goes to Step 315 in which it is determined whether the parameter s is −2, i.e., whether the first similar pixel is adjacent to the upper side of the objective pixel. When the parameter s is −2, Step 316 is executed in which a luminance value Y, color difference signals Cb and Cr, and a modified luminance value YG are obtained using the second R, first G, and second B-signals of the first similar pixel.

The luminance value Y, the color difference signals Cb and Cr, and the modified luminance value YG are calculated according to the following formulas (5b), (6b), (7b), and (8b).

$$Y=0.299 \times R(x,y-1)+0.587 \times G(x,y-1)+0.114 \times B(x,y-1) \quad (5b)$$

$$Cb=-0.169 \times R(x,y-1)-0.331 \times G(x,y-1)+0.5 \times B(x,y-1) \quad (6b)$$

$$Cr=0.5 \times R(x,y-1)-0.419 \times G(x,y-1)-0.081 \times B(x,y-1) \quad (7b)$$

$$YG=Y \times G(x,y)/G(x,y-1) \quad (8b)$$

Then, in ways similar to those in Steps 311 and 314, Step 312 is executed in which the second G-signal of the objective pixel is modified according to formula (9), a third B-signal of the objective pixel is calculated according to the formula (10), and the first interpolation/modification process routine ends.

When it is determined in Step 315 that the parameter s is not −2, it is deemed that the parameter is 2, i.e., it is deemed that the first similar pixel is adjacent to the lower side of the objective pixel. Thus, Step 317 is executed in which a luminance value Y, color difference signals Cb and Cr, and a modified luminance value YG are obtained using the second R, first G, and second B-signals of the first similar pixel.

The luminance value Y, the color difference signals Cb and Cr, and the modified luminance value YG are calculated according to the following formulas (5c), (6c), (7c), and (8c).

$$Y=0.299 \times R(x,y+1)+0.587 \times G(x,y+1)+0.114 \times B(x,y+1) \quad (5c)$$

$$Cb=-0.169 \times R(x,y+1)-0.331 \times G(x,y+1)+0.5 \times B(x,y+1) \quad (6c)$$

$$Cr=0.5 \times R(x,y+1)-0.419 \times G(x,y+1)-0.081 \times B(x,y+1) \quad (7c)$$

$$YG=Y \times G(x,y)/G(x,y+1) \quad (8c)$$

Then, in ways similar to those in Steps 311, 314, and 316, Step 312 is executed in which the second G-signal of the objective pixel is modified according to formula (9), a third B-signal of the objective pixel is calculated according to the formula (10), and the first interpolation/modification process routine ends.

The first interpolation/modification process routine is executed for all of the pixels of the image belonging to the first pattern. When the G-interpolation process routine (FIG. 4), the R/B-interpolation process routine (FIG. 5), and the first interpolation/modification process routine (FIGS. 7A and 7B) have been completed, the R, G, and B-signals are obtained for the images belonging to the first, second, and third patterns; however, the R-signals of the image belonging to the fourth pattern have not been obtained yet.

The R-signals of the image of the fourth pattern are obtained by the second interpolation/modification process routine. Further, in the second interpolation/modification process routine, the second G-signal obtained by the G-interpolation process routine is modified.

Figure 8:
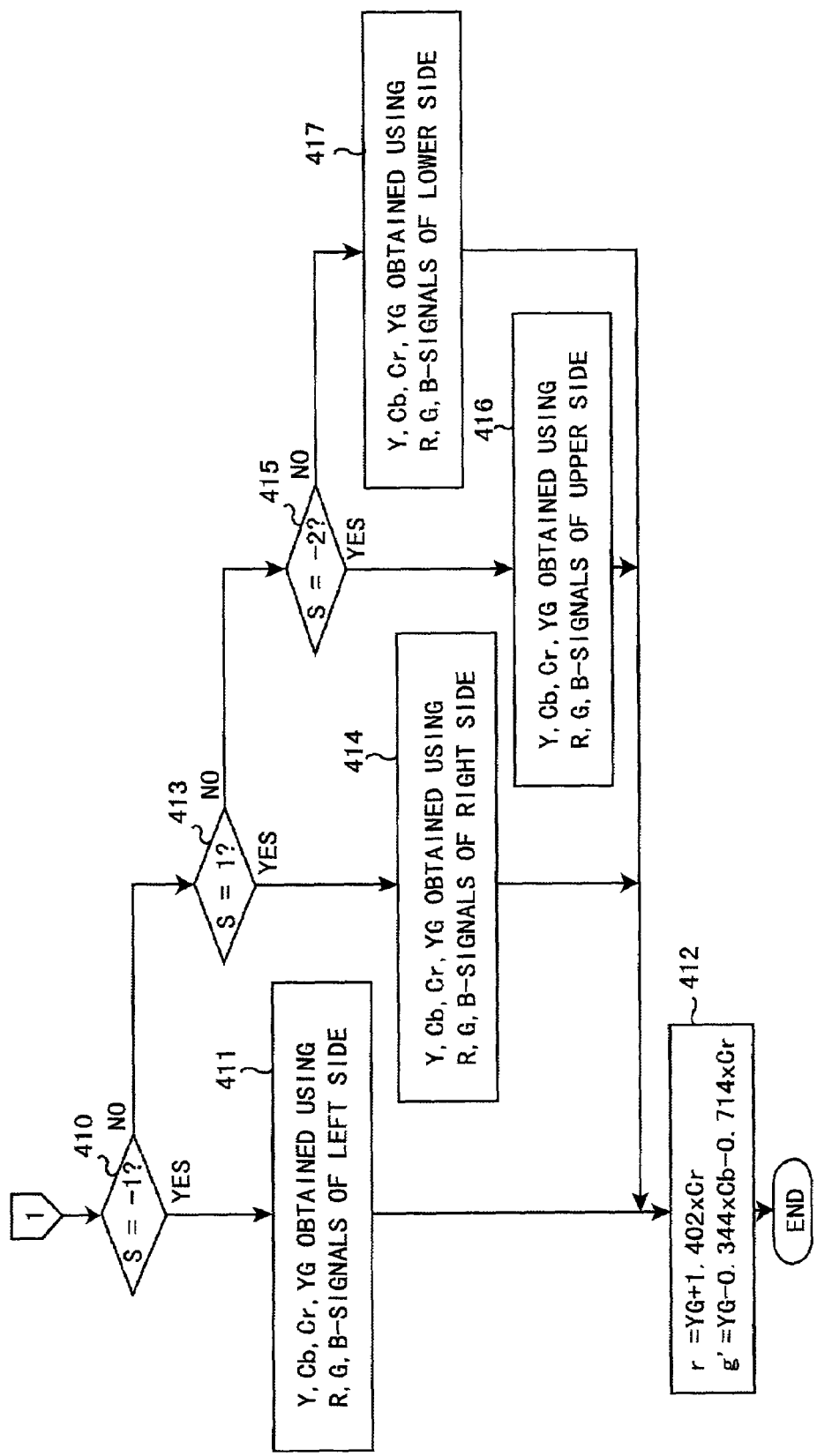
FIG. 8 is the latter part of a flowchart of a second interpolation/modification process routine.

FIG. 8 is the latter part of a flowchart of the second interpolation/modification process routine. Note that, since the initial part of the flowchart is identical to that of the first interpolation/modification process routine shown in FIG. 7A, excepting that the pixel having the first G-signal, which is determined in the second interpolation/modification process routine to have the closest luminance to the second G-signal of the objective pixel, is referred to as a second similar pixel, the initial part is omitted. Pixels utilized in the second interpolation/modification process routine are contained in the images belonging to the second and third patterns.

The contents of Steps 410, 413, and 415 are the same as those of Steps 310, 313, and 315 (FIG. 7B). The contents of Steps 411, 414, 416, and 417 are the same as those of Steps 311, 314, 316, and 317.

In Step 412, a third R-signal r of the objective pixel is calculated according to the formula (11), which is equivalent to an interpolation process. Further, the second G-signal of the objective pixel is modified according to the formula (12), so that a modified G-signal g' is obtained.

$$r=YG+1.402 \times Cr \quad (11)$$

$$g'=YG-0.344 \times Cb-0.714 \times Cr \quad (12)$$

The second interpolation/modification process routine is executed for all of the pixels of the image belonging to the fourth pattern.

Thus, in the second interpolation/modification process routine, in a similar way as in the first interpolation/modification process routine, the third R-signal of the objective pixel is obtained by interpolation, and the second G-signal is modified, by supposing that the color difference signals Cb and Cr of the objective pixel are equal to the color difference signals Cb and Cr of a second similar pixel, and by deeming the modified luminance value YG to be the luminance value of the objective pixel.

As described above, in the first interpolation/modification process routine (FIGS. 7A and 7B) and the second interpolation/modification process routine (FIG. 8), a pixel, which has the closest luminance value to the objective pixel, is extracted from pixels positioned at the left, right, upper, and lower sides of the objective pixel, so that the interpolation process is performed, in the first embodiment. The correlation of colors of two pixels becomes great as the luminance values of the two pixels become close to each other. Accordingly, in the interpolation process, the color difference signals of the similar pixel are set to the color difference signals of the objective pixel, so that a pixel signal having a closer color to the actual color of the objective pixel can be obtained. Therefore, according to the first embodiment, the chromatic blur occurring in a reproduced image can be reduced.

Further, in the first embodiment, since the second G-signal obtained by the G-interpolation process routine is modified according to the formulas (9) and (12), the hue or color of the objective pixel becomes close to that of the pixels positioned around it, which reduces the color blur in the whole image.

Figure 9:
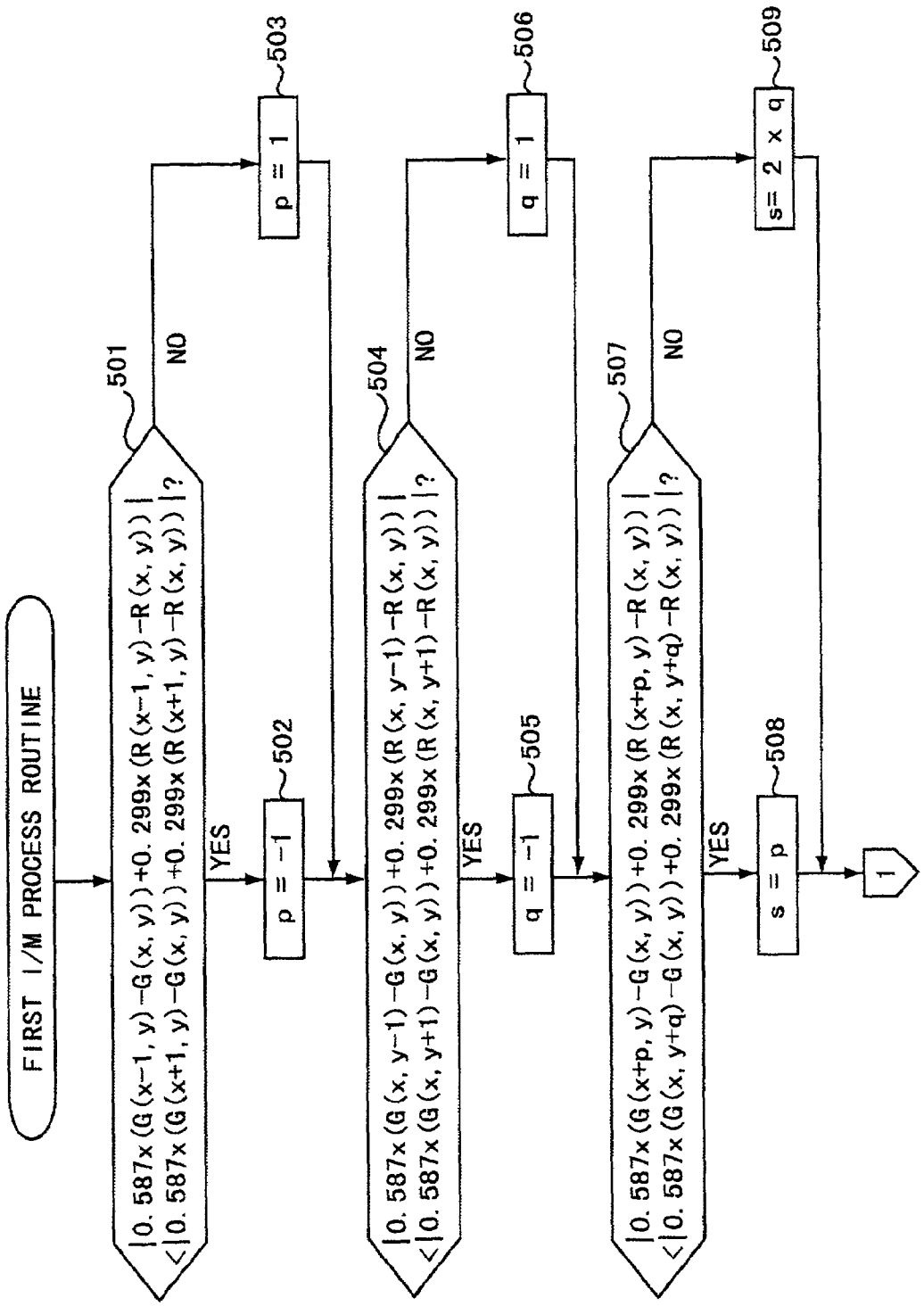
FIG. 9 is the initial part of a flowchart of the first interpolation/modification process routine of a second embodiment.
Figure 10:
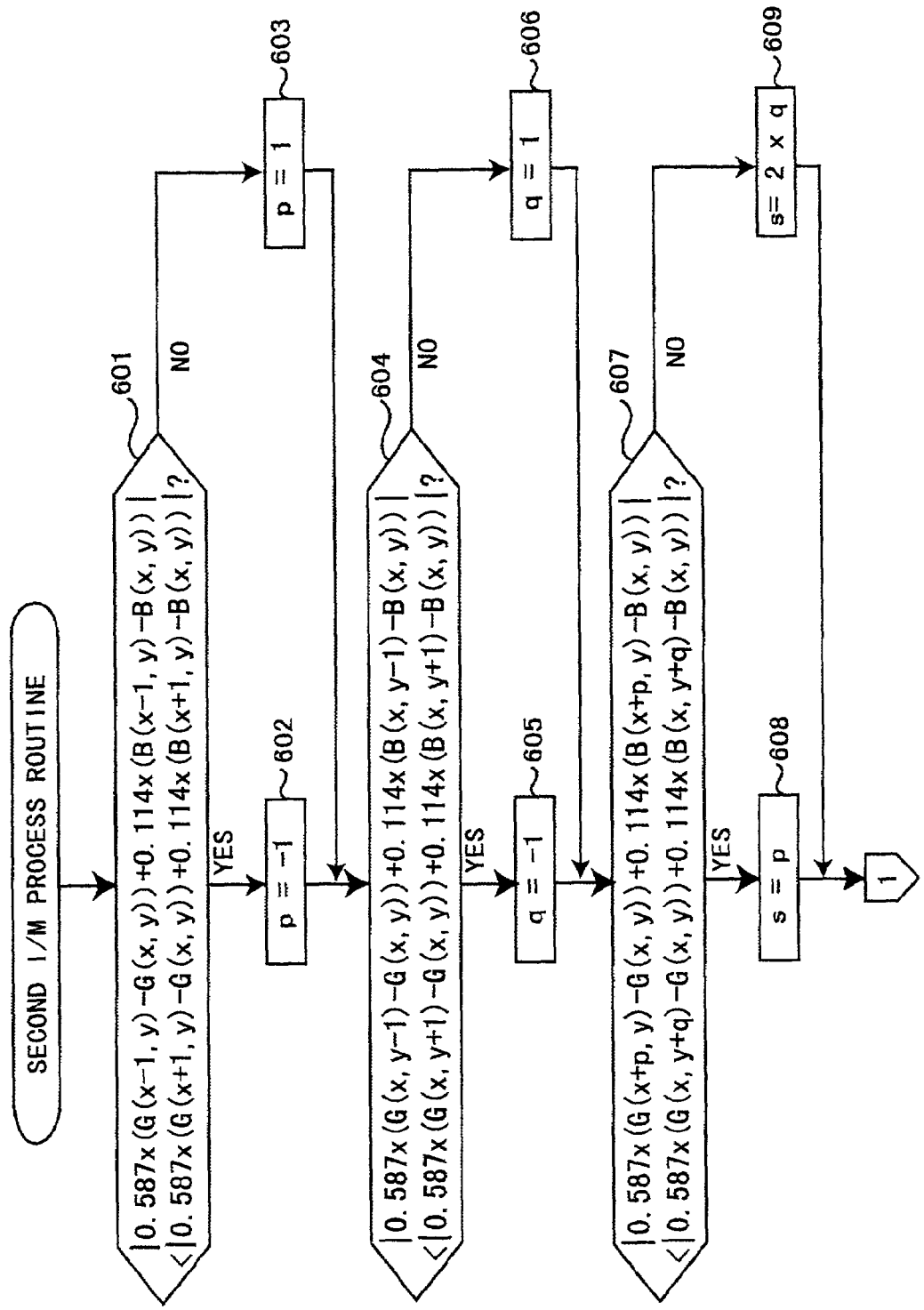
FIG. 10 is the initial part of a flowchart of the second interpolation/modification process routine of the second embodiment.

With reference to FIGS. 9 and 10, a second embodiment is described below. FIG. 9 is the initial part of a flowchart of the first interpolation/modification process routine of the second embodiment. FIG. 10 is the initial part of a flowchart of the second interpolation/modification process routine of the second embodiment. The other constructions are the same as those of the first embodiment, and the explanation thereof is omitted.

In Step 501, it is determined whether the following inequality (13) is established. The inequality compares luminance values of pixels positioned adjacent to the left and right sides of the objective pixel with the luminance value of the objective pixel.

$$|0.587 \times (G(x-1,y)-G(x,y))+0.299 \times (R(x-1,y)-R(x,y))| < |0.587 \times (G(x+1,y)-G(x,y))+0.299 \times (R(x+1,y)-R(x,y))| \quad (13)$$

When an inequality (13) exists, i.e., when the luminance value of the left side pixel is closer to the luminance value of the objective pixel, Step 502 is executed in which a parameter p is set to −1. Conversely, when an inequality (13) does not exist, i.e., when the luminance value of the right side pixel is closer to the luminance value of the objective pixel, or when the left side of the inequality (13) is equal to the right side of that, Step 503 is executed in which a parameter p is set to 1.

In Step 504, it is determined whether the following inequality (14) is established, which compares luminance values of pixels positioned adjacent to the upper and lower sides of the objective pixel with a luminance value of the objective pixel.

$$|0.587 \times (G(x,y-1)-G(x,y))+0.299 \times (R(x,y-1)-R(x,y))| < |0.587 \times (G(x,y+1)-G(x,y))+0.299 \times (R(x,y+1)-R(x,y))| \quad (14)$$

When an inequality (14) exists, i.e., when the luminance value of the upper side pixel is closer to the luminance value of the objective pixel, Step 505 is executed in which a parameter q is set to −1. Conversely, when an inequality (14) does not exist, i.e., when the luminance value of the lower side pixel is closer to the luminance value of the objective pixel, or when the left side of the inequality (14) is equal to the right side of that, Step 506 is executed in which a parameter q is set to 1.

In Step 507, regarding a pixel adjacent to the right or left side of the objective pixel, a pixel adjacent to the upper or lower side of the objective pixel, and the objective pixel, the luminance values are compared according to the following inequality (15).

$$|0.587 \times (G(x+p,y)-G(x,y))+0.299 \times (R(x+p,y)-R(x,y))| < |0.587 \times (G(x,y+q)-G(x,y))+0.299 \times (R(x,y+q)-R(x,y))| \quad (15)$$

When both of the parameters p and q are −1, and the inequality (15) is true, the luminance value of the left side pixel is the closest to the luminance value of the objective pixel, so that Step 508 is executed in which a parameter s is set to p, i.e., −1. Conversely, when the inequality (15) does not exist, i.e., when the luminance value of the upper side pixel is closer to the luminance value of the objective pixel, or when the left side of the inequality (15) is equal to the right side of that, Step 509 is executed in which the parameter s is set to 2×q, i.e., −2.

When both of the parameters p and q are 1, when the parameters p and q are −1 and 1, or when the parameters p and q are 1 and −1, Step 507 and Step 508 or 509 are executed in a similar way as the above. Thus, in the first interpolation/modification process routine, the second G-signal and first R-signal of the objective pixel, and the first G-signals and second R-signals of the adjacent pixels contained in images belonging to the second and third patterns are used to check the luminance values. As a result, if the luminance value of the left side pixel is the closest, the parameter s is set to −1. If the luminance value of the right side pixel is the closest, the parameter s is set to 1, if the luminance value of the upper side pixel is the closest, the parameter s is set to −2, and if the luminance value of the lower side pixel is the closest, the parameter s is set to 2.

Thus, after the first similar pixel having the closest luminance value to that of the objective pixel is extracted, the luminance value Y, the color difference signals Cb and Cr, and a modified luminance value YG are obtained using the second R, first G, and second B-signals of the first similar pixel, in accordance with a process similar to the flowchart shown in FIG. 7B, so that a third B-signal of the objective pixel is obtained, and the second G-signal is modified. Note that the modified luminance value YG is obtained according to the following formula (16), using the G-signals and R-signals of the objective pixel and the first similar pixel. The other formulas are the same as those of the first embodiment.

$$YG = Y \times (0.587 \times G(x,y)+0.299 \times R(x,y))/(0.587 \times G(x',y')+0.299 \times R(x',y')) \quad (16)$$

wherein G(x',y') indicates the first G-signal of the similar pixel and R(x',y') indicates the second R-signal of the similar pixel.

In the second interpolation/modification process routine (FIG. 10), a third R-signal of the fourth pattern is obtained, and the second G-signal is modified. In step 601, it is determined whether the following inequality (17), which compares luminance values of pixels positioned adjacent to the left and right sides of the objective pixel with a luminance value of the objective pixel, is established.

$$|0.587 \times (G(x-1,y)-G(x,y))+0.114 \times (B(x-1,y)-B(x,y))| < |0.587 \times (G(x+1,y)-G(x,y))+0.114 \times (B(x+1,y)-B(x,y))| \quad (17)$$

When an inequality (17) exists, Step 602 is executed in which a parameter p is set to −1, and when an inequality (17) does not exist, Step 603 is executed in which a parameter p is set to 1.

In Step 604, it is determined whether the following inequality (18) is established. This inequality compares luminance values of pixels positioned adjacent to the upper and lower sides of the objective pixel with a luminance value of the objective pixel.

$$|0.587 \times (G(x,y-1)-G(x,y))+0.114 \times (B(x,y-1)-B(x,y))| < |0.587 \times (G(x,y+1)-G(x,y))+0.114 \times (B(x,y+1)-B(x,y))| \quad (18)$$

When an inequality (18) exists, Step 605 is executed in which a parameter q is set to −1, and when an inequality (18) does not exist, Step 606 is executed in which a parameter q is set to 1.

In Step 607, regarding a pixel adjacent to the right or left side of the objective pixel, a pixel adjacent to the upper or lower side of the objective pixel, and the objective pixel, the luminance values are compared according to the following inequality (19).

$$|0.587 \times (G(x+p,y)-G(x,y))+0.114 \times (B(x+p,y)-B(x,y))| < |0.587 \times (G(x,y+q)-G(x,y))+0.114 \times (B(x,y+q)-B(x,y))| \quad (19)$$

When both of the parameters p and q are −1, and an inequality (19) exists, the luminance value of the left side pixel is the closest to the luminance value of the objective pixel, so that Step 608 is executed in which the parameter s is set to p, i.e., −1. Conversely, when an inequality (19) does not exist, i.e., when the luminance value of the upper side pixel is closer or equal to the luminance value of the objective pixel, Step 609 is executed in which the parameter s is set to 2×q, i.e., −2.

When both of the parameters p and q are 1, when the parameters p and q are −1 and 1, or when the parameters p and q are 1 and −1, Step 607 and Step 608 or 609 are executed in a similar way as the above. Thus, in the second interpolation/modification process routine, the second G-signal and first B-signal of the objective pixel, and the first G-signals and second B-signals of the adjacent pixels contained in images belonging to the second and third patterns are used to check the luminance values. As a result, if the luminance value of the left side pixel is the closest, the parameter s is set to −1. If the luminance value of the right side pixel is the closest, the parameter s is set to 1, if the luminance value of the upper side pixel is the closest, the parameter s is set to −2, and if the luminance value of the lower side pixel is the closest, the parameter s is set to 2.

Thus, after the second similar pixel having the closest luminance value to that of the objective pixel is extracted, the luminance value Y, the color difference signals Cb and Cr, and a modified luminance value YG are obtained using the second R, first G, and second B-signals of the first similar pixel, in accordance with a process similar to the flowchart shown in FIG. 8, so that a third R-signal of the objective pixel is obtained, and the second G-signal is modified. Note that the modified luminance value YG is obtained according to the following formula (20), using the G-signals and B-signals of the objective pixel and the first similar pixel.

$$YG=Y\times(0.587\times G(x,y)+0.114\times B(x,y))/(0.587\times G(x',y')+0.114\times B(x',y')) \quad (20)$$

wherein G(x',y') indicates the first G-signal of the similar pixel and B(x',y') indicates the second B-signal of the similar pixel.

According to the second embodiment, since the first G-signal and the second R-signal or the second B-signal are used as the luminance value in the first interpolation/modification process routine (FIG. 9) and the second interpolation/modification process routine (FIG. 10), the luminance signal can be checked with a high accuracy. Therefore, the chromatic blur occurring in a reproduced image can be further reduced compared to the first embodiment.

Figure 11:
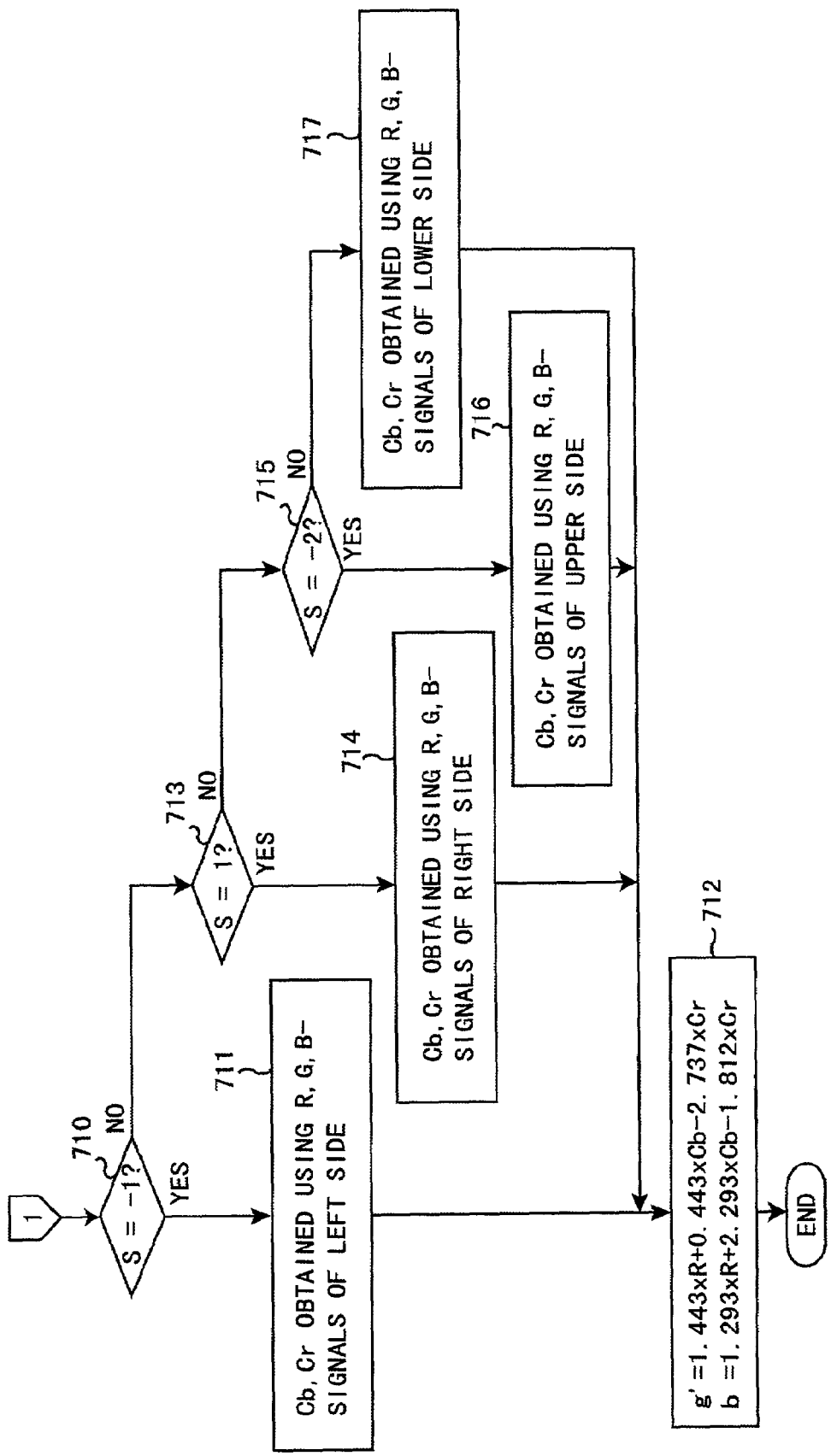
FIG. 11 is the latter part of a flowchart of the first interpolation/modification process of a third embodiment.
Figure 12:
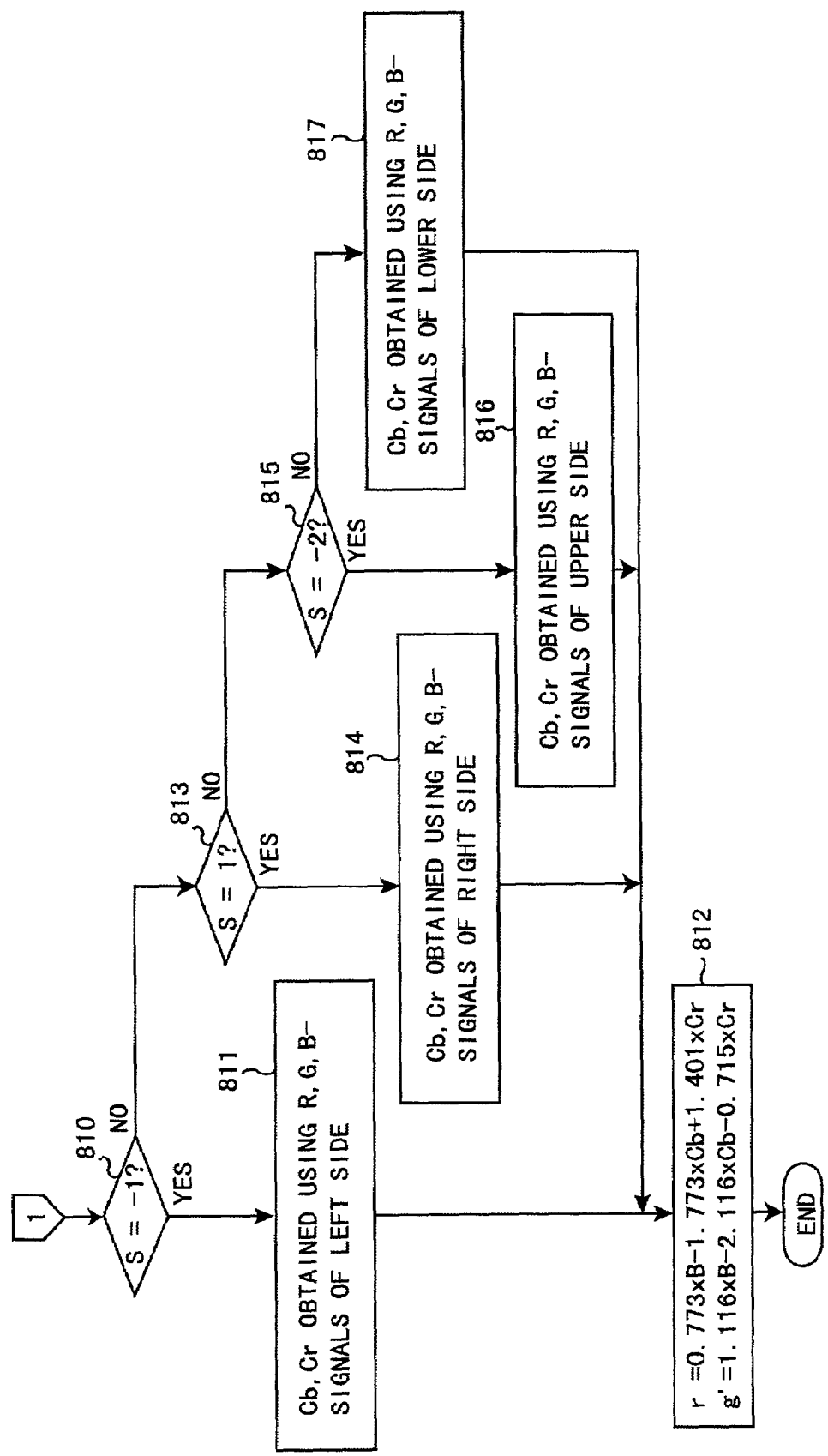
FIG. 12 is the latter part of a flowchart of the second interpolation/modification process routine of the third embodiment.

With reference to FIGS. 11 and 12, a third embodiment is described below. FIG. 11 is the latter part of a flowchart of the first interpolation/modification process routine of the third embodiment. The initial part of the flowchart is identical with that shown in FIG. 7A. FIG. 12 is the latter part of a flowchart of the second interpolation/modification process routine of the third embodiment. The initial part of the flowchart is identical with that shown in FIG. 7A. The other constructions are the same as those of the first embodiment, and the explanation thereof is omitted.

In Step 710, it is determined whether the parameter s is −1, i.e., whether the first similar pixel is adjacent to the left side of the objective pixel. When the parameter s is −1, Step 711 is executed in which color difference signals Cb and Cr are obtained using R(x−1,y), G(x−1,y), and B(x−1,y) which are the second R, first G, and second B-signals of the first similar pixel.

The color difference signals Cb and Cr are calculated according to the following formulas (21) and (22).

$$Cb=-0.169\times R(x-1,y)-0.331\times G(x-1,y)+0.5\times B(x-1,y) \quad (21)$$

$$Cr=0.5\times R(x-1,y)-0.419\times G(x-1,y)-0.081\times B(x-1,y) \quad (22)$$

The formulas (21) and (22) are known.

In Step 712, the second G-signal of the objective pixel is calculated or modified according to the formula (23), so that a modified G-signal g' is obtained. Further, a third B-signal of the objective signal is calculated according to the formula (24), which is equivalent to an interpolation process. Thus, the first interpolation/modification process routine ends.

$$g'=1.443\times R(x,y)+0.443\times Cb-2.737\times Cr \quad (23)$$

$$b=1.293\times R(x,y)+2.293\times Cb-1.812\times Cr \quad (24)$$

In the formulas (23) and (24), R(x,y) is the first R-signal of the objective pixel.

Thus, in the third embodiment, the third B-signal of the objective pixel is obtained by interpolation, and the second G-signal is modified, supposing that the color difference signals Cb and Cr of the objective pixel are equal to the color difference signals Cb and Cr of the first similar pixel.

When it is determined in Step 710 that the parameter s is not −1, the process goes to Step 713 in which it is determined whether the parameter s is 1, i.e., whether the first similar pixel is adjacent to the right side of the objective pixel. When the parameter s is 1, Step 714 is executed in which color difference signals Cb and Cr are obtained using the second R, first G, and second B-signals of the first similar pixel.

The color difference signals Cb and Cr are calculated according to the following formulas (21a) and (22a).

$$Cb=-0.169\times R(x+1,y)-0.331\times G(x+1,y)+0.5\times B(x+1,y) \quad (21a)$$

$$Cr=0.5\times R(x+1,y)-0.419\times G(x+1,y)-0.081\times B(x+1,y) \quad (22a)$$

Step 712 is then executed. Namely, the second G-signal of the objective pixel is modified according to the formula (23), so that a modified G-signal g' is obtained. Further, a third B-signal of the objective signal is calculated according to the formula (24). Thus, the first interpolation/modification process routine ends.

When it is determined in Step 713 that the parameter s is not 1, the process goes to Step 715 in which it is determined whether the parameter s is −2, i.e., whether the first similar pixel is adjacent to the upper side of the objective pixel. When the parameter s is −2, Step 716 is executed in which color difference signals Cb and Cr are obtained using the second R, first G, and second B-signals of the first similar pixel.

The color difference signals Cb and Cr are calculated according to the following formulas (21b) and (22b).

$$Cb=-0.169\times R(x,y-1)-0.331\times G(x,y-1)+0.5\times B(x,y-1) \quad (21b)$$

$$Cr=0.5\times R(x,y-1)-0.419\times G(x,y-1)-0.081\times B(x,y-1) \quad (22b)$$

Then, in ways similar to those in Steps 711 and 714, Step 712 is executed in which the second G-signal of the objective pixel is modified according to the formula (23), a third B-signal of the objective pixel is calculated according to the formula (24), and the first interpolation/modification process routine ends.

When it is determined in Step 715 that the parameter s is not −2, it is deemed that the parameter is 2, i.e., it is deemed that the first similar pixel is adjacent to the lower side of the objective pixel. Thus, Step 717 is executed in which color difference signals Cb and Cr are obtained using the second R, first G, and second B-signals of the first similar pixel.

The color difference signals Cb and Cr are calculated according to the following formulas (21c) and (22c).

$$Cb=-0.169\times R(x,y+1)-0.331\times G(x,y+1)+0.5\times B(x,y+1) \quad (21c)$$

$$Cr=0.5\times R(x,y+1)-0.419\times G(x,y+1)-0.081\times B(x,y+1) \quad (22c)$$

Then, in ways similar to those in Steps 711, 714, and 716, Step 712 is executed in which the second G-signal of the objective pixel is modified according to the formula (23), a third B-signal of the objective pixel is calculated according to the formula (24), and the first interpolation/modification process routine ends.

The first interpolation/modification process routine is executed for all of the pixels of the image belonging to the first pattern. When the G-interpolation process routine (FIG. 4), the R/B-interpolation process routine (FIG. 5), and the first interpolation/modification process routine (FIGS. 7A and 11) have been completed, the R, G, and B-signals are obtained for the images belonging to the first, second, and third patterns; however, the R-signals of the image belonging to the fourth pattern have not been obtained yet.

The R-signals of the image of the fourth pattern are obtained by using the second interpolation/modification process routine. Further, in the second interpolation/modification process routine, the second G-signal obtained by the G-interpolation process routine is modified. FIG. 12 is the latter part of a flowchart of the second interpolation/modification process routine. Note that the initial part of the flowchart is identical to that of the first interpolation/modification process routine shown in FIG. 7A, excepting that the extracted similar pixel is defined as the second similar pixel.

The contents of Steps 810, 811, 813 through 817 are identical with those in Steps 710, 711, 713 through 717 (FIG. 11).

In Step 812, a third R-signal r of the objective pixel is calculated according to the formula (25), which is equivalent to an interpolation process. Further, the second G-signal of the objective pixel is calculated or modified according to the formula (26), so that a modified G-signal g' is obtained.

$$r = 0.773 \times B(x,y) - 1.773 \times Cb + 1.401 \times Cr \quad (25)$$

$$g' = 1.116 \times B(x,y) - 2.116 \times Cb - 0.715 \times Cr \quad (26)$$

The second interpolation/modification process routine is executed for all of the pixels of the image belonging to the fourth pattern.

Thus, in the second interpolation/modification process routine, the third R-signal of the objective pixel is obtained by interpolation, and the second G-signal is modified, supposing that the color difference signals Cb and Cr of the objective pixel are equal to the color difference signals Cb and Cr of the second similar pixel, in a similar way to the first interpolation/modification process routine.

As described above, in the third embodiment, a similar pixel, which has the closest luminance value to that of the objective pixel, is extracted from pixels adjacent to the objective pixel, and an interpolation process is then performed, in the first interpolation/modification process routine and the second interpolation/modification process routine. Therefore, according to the third embodiment, the chromatic blur occurring in a reproduced image can be reduced, similarly to the first and second embodiments.

Further, according to the third embodiment, the second G-signal obtained in the G-interpolation process routine is modified according to the formulas (23) and (26). Accordingly, the hue or color of the objective pixel becomes close to that of the pixels positioned around the objective pixel, which further reduces the color blur in the whole image.

A fourth embodiment is obtained in such a manner that the initial parts of the flowcharts of the first interpolation/modification process routine and the second interpolation/modification process routine of the third embodiment are replaced by those shown in FIGS. 9 and 10, instead of the one shown in FIG. 7A. Namely, the first interpolation/modification process routine is obtained by combining FIGS. 9 and 11, and the second interpolation/modification process routine is obtained by combining FIGS. 10 and 12.

According to the fourth embodiment, since the first G-signal and the second R-signal or the second B-signal are used as the luminance value in the first interpolation/modification process routine (FIG. 9) and the second interpolation/modification process routine (FIG. 10), the luminance signal can be checked with a high accuracy. Therefore, the chromatic blur occurring in a reproduced image can be further reduced compared to the third embodiment.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2001-018044 (filed on Jan. 26, 2001) and No. 2001-030656 (filed on Feb. 7, 2001) which are expressly incorporated herein, by reference, in their entireties.

The invention claimed is:

1. An image interpolating device comprising:
a color filter having a first row, in which red (R) and green (G) color filter elements are alternately aligned in the horizontal direction, and a second row, in which G and blue (B) color filter elements are alternately aligned in the horizontal direction, said second row being adjacent to the upper or lower side of said first row;
an imaging device that generates R, G, and B-signals which are pixel signals corresponding to said color filter elements;
a pattern-setting processor that extracts images belonging to a first pattern, in which a pixel having said first R-signal is positioned at the upper-left corner of a 2×2 pixel matrix, a second pattern, in which a pixel having said first G-signal is positioned at the upper-right corner of said 2×2 pixel matrix, a third pattern, in which a pixel having said first G-signal is positioned at the lower-left corner of said 2×2 pixel matrix, and a fourth pattern, in which a pixel having said first B-signal is positioned at the lower-right corner of said 2×2 pixel matrix, from said first R, G, and B-signals generated by said imaging device;
a G-interpolation processor that, regarding first and fourth objective pixels contained in said images belonging to said first and fourth patterns, obtains a second G-signal by utilizing said first G-signals of pixels adjacent to said first or fourth objective pixel;
an R/B-interpolation processor that, regarding second and third objective pixels contained in said images belonging to said second and third patterns, obtains second R and B-signals by utilizing said first R and B-signals of pixels adjacent to said second and third objective pixels;
a first interpolation/modification processor that extracts a first similar pixel which has the closest luminance value to that of said first objective pixel, from pixels adjacent to said first objective pixel, obtains a third B-signal of said first objective pixel by a first interpolation process, and modifies said second G-signal of said first objective pixel, based on first information of said first similar pixel; and
a second interpolation/modification processor that extracts a second similar pixel which has the closest luminance value to that of said fourth objective pixel, from pixels adjacent to said fourth objective pixel, obtains a third R-signal of said fourth objective pixel by a second interpolation process, and modifies said second G-signal of said fourth objective pixel, based on second information of said second similar pixel.

2. A device according to claim 1, wherein said first information comprises a luminance value and color difference signals Cb and Cr of said first similar pixel, and said second information comprises a luminance value and color difference signals Cb and Cr of said second similar pixel.

3. A device according to claim 1, wherein said first information comprises said first R-signal of said first objective pixel and color difference signals Cb and Cr of said first similar pixel, and said second information comprises said first B-signal of said fourth objective pixel and color difference signals Cb and Cr of said second similar pixel.

4. A device according to claim 1, wherein said pixels, which are adjacent to said first and fourth objective pixels and which are utilized in said G-interpolation processor, are contained in said images belonging to said second and third patterns.

5. A device according to claim 1, wherein said pixels, which are adjacent to said second and third objective pixels and which are utilized in said R/B-interpolation processor, are contained in said images belonging to said first and fourth patterns.

6. A device according to claim 1, wherein said pixels, which are adjacent to said first and fourth objective pixels and which are utilized in both said first interpolation/modification processor and said second interpolation/modification processor, are contained in said images belonging to said second and third patterns.

7. A device according to claim 1, wherein said first interpolation/modification processor and said second interpolation/modification processor respectively extract said first and second similar pixels, using said first G-signals of said pixels adjacent to said first and fourth objective pixels.

8. A device according to claim 1, wherein said first interpolation/modification processor obtains said third B-signal and modifies said second G-signal, on the assumption that said color difference signals Cb and Cr of said first objective pixel are equal to said color difference signals Cb and Cr of said first similar pixel.

9. A device according to claim 1, wherein said second interpolation/modification processor obtains said third R-signal and modifies said second G-signal, on the assumption that said color difference signals Cb and Cr of said fourth objective pixel are equal to said color difference signals Cb and Cr of said second similar pixel.

10. A device according to claim 1, wherein said first interpolation/modification processor obtains said third B-signal and modifies said second G-signal, using said color difference signals Cb and Cr and a modified luminance value which is obtained by multiplying said luminance value by a ratio of said second G-signal of said first objective pixel and said first G-signal of said first similar pixel.

11. A device according to claim 10, wherein said first interpolation/modification processor obtains said third B-signal and modifies said second G-signal, according to the following formula:

$$Y=0.299 \times R(x',y')+0.587 \times G(x',y')+0.114 \times B(x',y')$$

$$Cb=0.169 \times R(x',y')-0.331 \times G(x',y')+0.5 \times B(x',y')$$

$$Cr=0.5 \times R(x',y')-0.419 \times G(x',y')-0.081 \times B(x',y')$$

$$YG=Y \times G(x,y)/G(x',y')$$

$$g'=YG-0.344 \times Cb-0.714 \times Cr$$

$$b=YG+1.772 \times Cb$$

wherein Y is a luminance value of said first similar pixel, R(x', y'), G(x', y'), and B(x', y') are said second R, first G, and second B-signals of said first similar pixel, G(x,y) is said second G-signal of said first objective pixel, b is said third B-signal obtained by said first interpolation/modification processor, and g' is said modified second G-signal.

12. A device according to claim 1, wherein said second interpolation/modification processor obtains said third R-signal and modifies said second G-signal, using said color difference signal Cr and a modified luminance value which is obtained by multiplying said luminance value by a ratio of said second G-signal of said fourth objective pixel and said first G-signal of said second similar pixel.

13. A device according to claim 12, wherein said second interpolation/modification processor obtains said third R-signal and modifies said second G-signal, according to the following formula:

$$Y=0.299 \times R(x',y')+0.587 \times G(x',y')+0.114 \times B(x',y')$$

$$Cb=0.169 \times R(x',y')-0.331 \times G(x',y')+0.5 \times B(x',y')$$

$$Cr=0.5 \times R(x',y')-0.419 \times G(x',y')-0.081 \times B(x',y')$$

$$YG=Y \times G(x,y)/G(x',y')$$

$$r=YG+1.402 \times Cr$$

$$g'=YG-0.344 \times Cb-0.714 \times Cr$$

wherein Y is a luminance value of said second similar pixel, R(x', y'), G(x', y'), and B(x', y') are said second R, first G, and second B-signals of said second similar pixel, G(x,y) is said second G-signal of said fourth objective pixel, r is said third R-signal obtained by said second interpolation/modification processor, and g' is said modified second G-signal.

14. A device according to claim 1, wherein said first interpolation/modification processor extracts said first similar pixel, using said first G-signal and said second R-signal of said pixel adjacent to said first objective pixel.

15. A device according to claim 1, wherein said second interpolation/modification processor extracts said second similar pixel, using said first G-signal and said second B-signal of said pixels adjacent to said fourth objective pixel.

16. A device according to claim 1, wherein said first interpolation/modification processor obtains said third B-signal and modifies said second G-signal, using said color different signal Cb and a modified luminance value which is obtained by multiplying said luminance value by a ratio of a first reference value, which is obtained based on said second G-signal and said first R-signal of said first objective pixel, and a second reference value, which is obtained based on said first G-signal and second R-signal of said first similar pixel.

17. A device according to claim 16, wherein said first interpolation/modification processor obtains said third B-signal and modifies said second G-signal, according to the following formula:

$$Y=0.299 \times R(x',y')+0.587 \times G(x',y')+0.114 \times B(x',y')$$

$$Cb=0.169 \times R(x',y')-0.331 \times G(x',y')+0.5 \times B(x',y')$$

$$Cr=0.5 \times R(x',y')-0.419 \times G(x',y')-0.081 \times B(x',y')$$

$$YG=Y \times (0.587 \times G(x,y)+0.299 \times R(x,y))/(0.587 \times G(x',y')+0.299 \times R(x',y'))$$

$$g'=YG-0.344 \times Cb-0.714 \times Cr$$

$$b=YG+1.772 \times Cb$$

wherein Y is a luminance value of said first similar pixel, $R(x', y')$, $G(x', y')$, and $B(x', y')$ are said second R, first G, and second B-signals of said first similar pixel, $G(x,y)$ is said second G-signal of said first objective pixel, b is said third B-signal obtained by said first interpolation/modification processor, and g' is said modified second G-signal.

18. A device according to claim 1, wherein said second interpolation/modification processor obtains said third R-signal and modifies said second G-signal, using said color difference signal Cr and a modified luminance value which is obtained by multiplying said luminance value by a ratio of a first reference value, which is obtained based on said second G-signal and said first B-signal of said fourth objective pixel, and a second reference value, which is obtained based on said first G-signal and said second B-signal of said second similar pixel.

19. A device according to claim 18, wherein said second interpolation/modification processor obtains said third R-signal and modifies said second G-signal, according to the following formula:

$$Y=0.299 \times R(x',y')+0.587 \times G(x',y')+0.114 \times B(x',y')$$

$$Cb=0.169 \times R(x',y')-0.331 \times G(x',y')+0.5 \times B(x',y')$$

$$Cr=0.5 \times R(x',y')-0.419 \times G(x',y')-0.081 \times B(x',y')$$

$$YG=Y \times (0.587 \times G(x,y)+0.114 \times B(x,y))/(0.587 \times G(x',y')+0.114 \times B(x',y'))$$

$$r=YG+1.402 \times Cr$$

$$g'=YG-0.344 \times Cb-0.714 \times Cr$$

wherein Y is a luminance value of said second similar pixel, $R(x', y')$, $G(x', y')$, and $B(x', y')$ are said second R, first G, and second B-signals of said second similar pixel, $G(x, y)$ is said second G-signal of said fourth objective pixel, r is said third R-signal obtained by said second interpolation/modification processor, and g' is said modified second G-signal.

20. A device according to claim 1, wherein said first interpolation/modification processor obtains said third B-signal and modifies said second G-signal, according to the following formula:

$$Cb=0.169 \times R(x',y')-0.331 \times G(x',y')+0.5 \times B(x',y')$$

$$Cr=0.5 \times R(x',y')-0.419 \times G(x',y')-0.081 \times B(x',y')$$

$$g'=1.443 \times R(x,y)+0.443 \times Cb-2.737 \times Cr$$

$$b=1.293 \times R(x,y)+2.293 \times Cb-1.812 \times Cr$$

wherein $R(x', y')$, $G(x', y')$, and $B(x', y')$ are said second R, first G, and second B-signals of said first similar pixel, $R(x,y)$ is said first R-signal of said first objective pixel, b is said third B-signal obtained by said first interpolation/modification processor, and g' is said modified second G-signal.

21. A device according to claim 1, wherein said second interpolation/modification processor obtains said third R-signal and modifies said second G-signal, according to the following formula:

$$Cb=0.169 \times R(x',y')-0.331 \times G(x',y')+0.5 \times B(x',y')$$

$$Cr=0.5 \times R(x',y')-0.419 \times G(x',y')-0.081 \times B(x',y')$$

$$r=0.773 \times B(x,y)-1.773 \times Cb+1.401 \times Cr$$

$$g'=1.116 \times B(x,y)-2.116 \times Cb-0.715 \times Cr$$

wherein $R(x', y')$, $G(x', y')$, $B(x', y')$ are said second R, first G, and second B-signals of said second similar pixel, $B(x,y)$ is said first B-signal of said fourth objective pixel, r is said third R-signal obtained by said second interpolation/modification processor, and g' is said modified second G-signal.

22. An image interpolating device comprising:

an imaging device that has a light receiving surface on which pixels are disposed in a matrix arrangement, a subject image being formed on said light receiving surface to generate first color signals corresponding to said subject image in said pixels;

an interpolation processor that performs an interpolation process, using said first color signals generated in a plurality of adjacent pixels positioned in adjacent to an objective pixel, to obtain a second color signal of said objective pixel; and a modification processor that extracts a similar pixel which has the closest luminance value to that of said objective pixel, from pixels adjacent to said objective pixel, and modifies said second color signal of said objective pixel, based on a luminance value and color difference signals Cb and Cr of said similar pixel.

23. An image interpolating device comprising:

an imaging device that has a light receiving surface on which pixels are disposed in a matrix arrangement, a subject image being formed on said light receiving surface to generate first color signals corresponding to said subject image in said pixels;

an interpolation processor that performs an interpolation process, using said first color signals generated in a plurality of adjacent pixels positioned adjacent to an objective pixel, to obtain a second color signal of said objective pixel; and a modification processor that extracts a similar pixel which has the closest luminance value to that of said objective pixel, from pixels adjacent to said objective pixel, and modifies said second color signal of said objective pixel, based on a color signal of said objective pixel and color difference signals Cb and Cr of said similar pixel.

* * * * *